US008571923B2

(12) United States Patent
Shetty et al.

(10) Patent No.: US 8,571,923 B2
(45) Date of Patent: Oct. 29, 2013

(54) ADVERTISEMENTS DRIVEN BY USER

(75) Inventors: Rohan Shetty, Bellevue, WA (US); Li Li, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 880 days.

(21) Appl. No.: 12/108,592

(22) Filed: Apr. 24, 2008

(65) Prior Publication Data
US 2009/0271254 A1    Oct. 29, 2009

(51) Int. Cl.
*G06Q 40/00* (2012.01)

(52) U.S. Cl.
USPC .... 705/14; 705/14.42; 705/14.49; 705/14.52; 705/14.54; 705/14.55; 705/14.56; 705/14.62; 705/14.64; 705/14.73; 709/219; 709/229; 715/719

(58) Field of Classification Search
None
See application file for complete search history.

(56) References Cited

U.S. PATENT DOCUMENTS

| 5,740,549 | A  | * | 4/1998  | Reilly et al. ............... 705/14.42 |
|---|---|---|---|---|
| 5,933,811 | A  | * | 8/1999  | Angles et al. ............... 705/14.56 |
| 5,948,061 | A  | * | 9/1999  | Merriman et al. ............ 709/219 |
| 5,959,623 | A  | * | 9/1999  | van Hoff et al. ............. 715/719 |
| 6,567,854 | B1 | * | 5/2003  | Olshansky et al. ........... 709/229 |
| 7,788,131 | B2 | * | 8/2010  | Nong et al. ................. 705/14.49 |
| 2001/0036182 | A1 | * | 11/2001 | Addante ..................... 370/389 |
| 2002/0062393 | A1 | * | 5/2002  | Borger et al. ................ 709/246 |
| 2002/0082908 | A1 | * | 6/2002  | Yi et al. ..................... 705/14 |
| 2002/0082914 | A1 | * | 6/2002  | Beyda et al. ................. 705/14 |
| 2002/0099600 | A1 | * | 7/2002  | Merriman et al. ............. 705/14 |
| 2002/0184092 | A1 | * | 12/2002 | Cherry et al. ................ 705/14 |
| 2002/0184093 | A1 | * | 12/2002 | Cherry et al. ................ 705/14 |
| 2003/0096625 | A1 | * | 5/2003  | Lee et al. ................... 455/466 |
| 2004/0117248 | A1 |   | 6/2004  | Dutta |
| 2006/0064348 | A1 | * | 3/2006  | Li ........................... 705/14 |
| 2007/0055566 | A1 | * | 3/2007  | Gaughan et al. ............. 705/14 |

(Continued)

FOREIGN PATENT DOCUMENTS

| WO | WO 97/21183 | * | 6/1997 |
|---|---|---|---|
| WO | WO0223372 A3 |  | 3/2002 |
| WO | WO0233970 A1 |  | 4/2002 |

OTHER PUBLICATIONS

"Synchronization of Multimedia Data for a Multimedia News-On-Demand Application", Louise Lamont, et al., IEEE Journal on Selected Areas in Communications, vol. 14, No. 1, Jan. 1996, pp. 264-278.*

(Continued)

*Primary Examiner* — Robert Niquette
(74) *Attorney, Agent, or Firm* — Shook Hardy & Bacon LLP

(57) ABSTRACT

Systems, methods and computer-storage media are provided for distributing advertising content with improved accessibility for users and with a reduced-cost architecture for the web site provider. An advertising service directory (ASD) intercepts advertising requests containing registered words and phrases so that their location can be determined in a data structure. Through user profile, web site preference or additional information in the reference data structure, the delivery format of the content can also be detected. The request is then forwarded to the provider, removing the need for the first web site provider to actually serve the advertising content. Users can use a phrase or format in order to "push" for advertising content. Thus, brand names and products can be accessible without the need to bid for ad placement. The effectiveness of advertising across many platforms can be increased by offering users an easier-to-remember retrieval method.

6 Claims, 5 Drawing Sheets

(56) References Cited

U.S. PATENT DOCUMENTS

| | | | |
|---|---|---|---|
| 2007/0100690 A1* | 5/2007 | Hopkins | 705/14 |
| 2007/0156838 A1 | 7/2007 | Kocho | |
| 2007/0244750 A1* | 10/2007 | Grannan et al. | 705/14 |
| 2009/0063280 A1* | 3/2009 | Wurster et al. | 705/14 |
| 2009/0157484 A1* | 6/2009 | Konowe | 705/10 |
| 2010/0121705 A1* | 5/2010 | Ramer et al. | 705/14.46 |
| 2010/0185512 A1* | 7/2010 | Borger et al. | 705/14.49 |

OTHER PUBLICATIONS

Jase Dow, "Push vs Pull Advertising," Jan. 13, 2005, 3 pp., http://tools.devshed.com/c/a/Website-Advertising/Push-vs-Pull-Advertising/.

Chandreasekar Subramaniam, et al., "Product Marketing On The Internet," Dept. of Business Administration, Univ. of Illinois at Urbana-Champaign, 26 pp.

Tuula Kapyla, et al., "Towards an Accessible Web by Applying PUSH Technology," VTT Information Technology, 15 pp.

* cited by examiner

ADVERTISEMENTS DRIVEN BY USER

BACKGROUND

As search engines have become more and more precise with their efficiency and accuracy, increasing numbers of users have relied upon them to locate specific resources. However, the current system of advertising on search engines through a bidding process coupled with the generic nature of most search queries decreases the likelihood that a user looking for a specific product will be able to easily locate it. Users that notice a billboard, bus advertisement or broadcast spot will be less likely to access further information regarding a product about which they have heard or seen. This decreases the effectiveness of other advertising campaigns and allows the high bidders on search engine advertisements to circumvent those companies who have established identifiable brands and products. If a user encounters too much difficulty in locating information about the specific product, that person is likely to simply investigate a competitor's offering. The relatively cumbersome nature of serving advertising content through a centralized storehouse maintained by the web site provider itself leads to reinforcement of the advertisement-by-bid system.

SUMMARY

Embodiments of the present invention relate to methods, systems, and computer-storage media for distributing advertising content in a manner that improves accessibility for users, while reducing the cost associated with architecture for the initial web site provider. By introducing an architecture in which users can "push" for advertising content, brand names and products can be accessible without the need to bid for advertising placement. The effectiveness of advertising across many platforms can be increased by offering users a unified manner in which to request advertisements and product information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. An advertising service directory (ASD) intercepts advertising requests containing registered words and phrases so that the location of those advertisements can be determined in a data structure. The requests can be specially formatted to trigger the interception. Once received by the ASD, the request is referenced to determine the location to which the request should be sent. Either through user profile, web site preference or additional information in the reference data structure, the delivery format of the content can also be detected. The request is then forwarded to the content provider, removing the need for the initial web site provider to actually serve the content and returning the service function to the entity that is advertising.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer storage media having computer-executable instructions embodied thereon that, when executed, perform methods for de-centralizing advertising content service while at the same time increasing accessibility for brand and product information. An advertising service directory (ASD) translates advertising requests from their registered words and phrases to a location from which the advertising should be retrieved. The requests can be specially formatted to so that the ASD intercepts the request and looks up the corresponding address. Through user profile, web site preference or additional information in the data structure, the delivery format of the content can also be detected. Rather than have the first web site provider to actually serve the advertising content, forwarding the request to a provider such as the company itself or an advertising agency allows for a distributed model of delivery.

Having briefly described an overview of embodiments of the present invention, an exemplary operating environment suitable for implementing embodiments hereof is described below.

Figure 1:
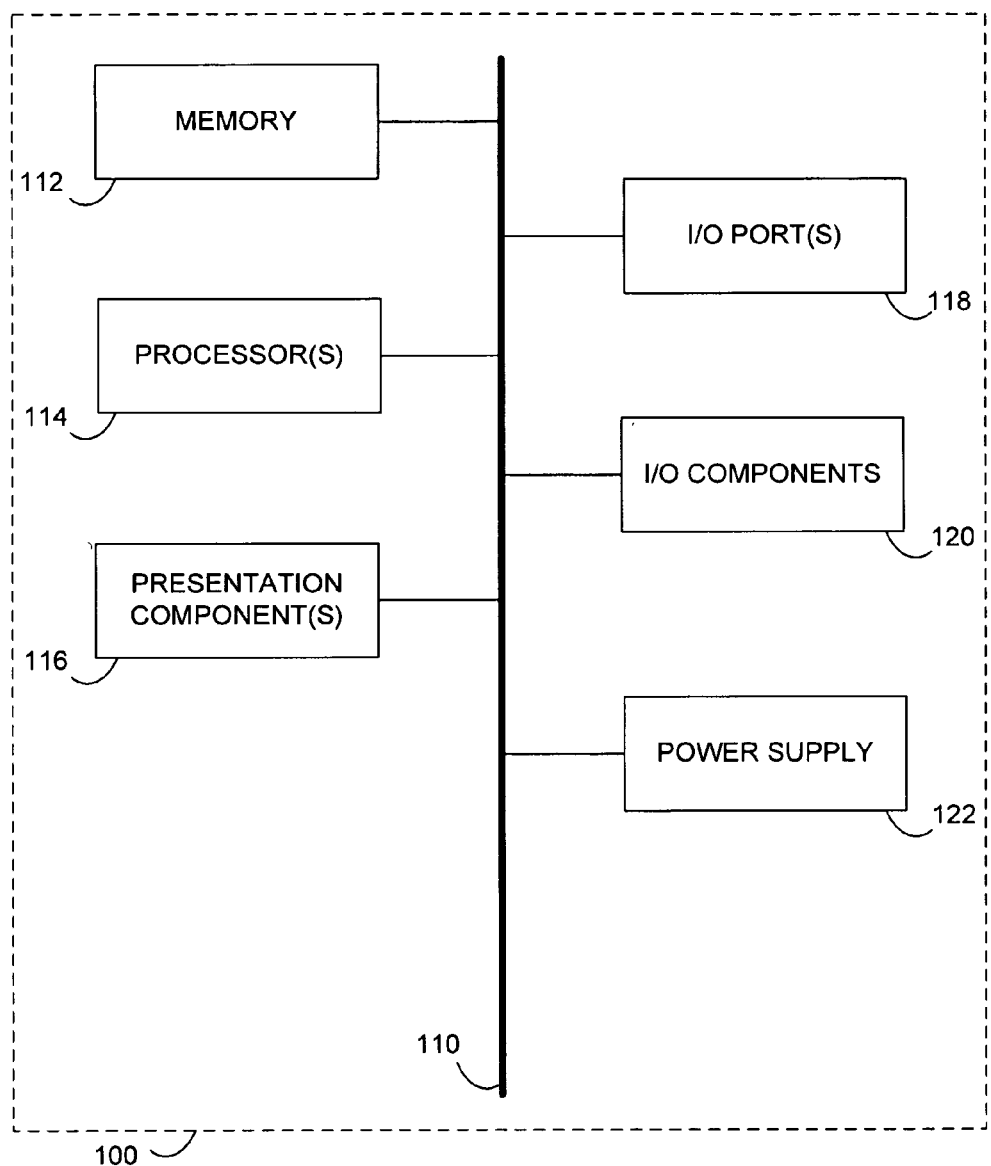
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Figure 2:
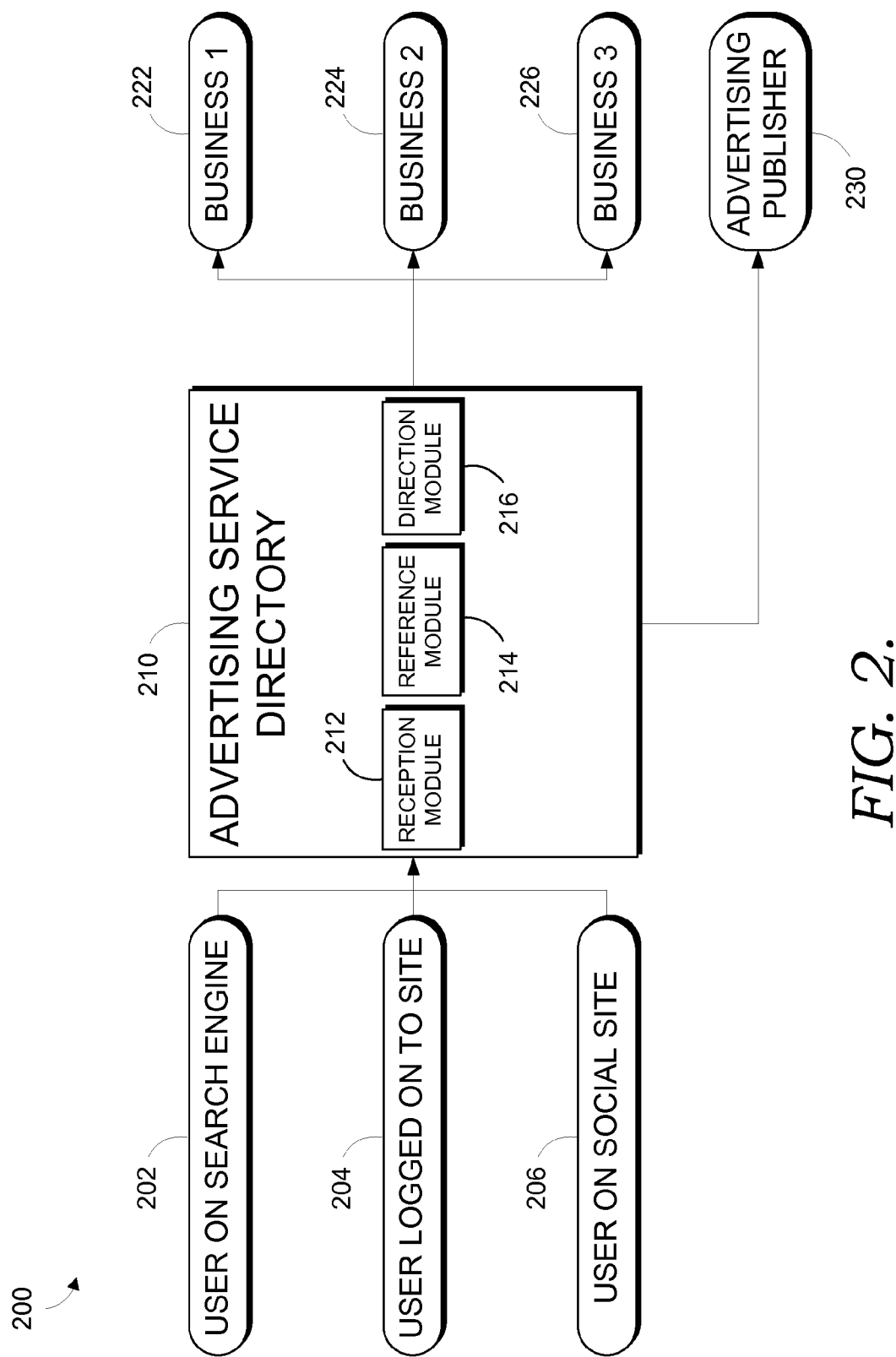
FIG. 2 is a block diagram of a exemplary system for coordinating the delivery of online advertising.

Turning now to FIG. 2, a block diagram of a exemplary system 200 for coordinating the delivery of online advertising is shown. The system has a number of exemplary users depicted, which are intended to be illustrative and should not be construed as a limitation of the claimed embodiments. A user on a search engine 202, a user logged on to a web site 204, and a user on a social networking web site 206 are all shown. These are not meant to convey a single user of each type, but to show different categories of users that can employ the claimed systems, methods and media. The claimed embodiments do not require all or any of these categories. There are other categories of users that may not be shown that are contemplated within the scope of the present invention.

User 202 can be a user on a search engine web site, such as a user on www.live.com provided by the Microsoft Corporation of Redmond, Wash. Alternatively, user 202 can be a user on any one of a number of other search engine web sites. User 206 can be on any social networking web site that allows users to login in to one or more networks. Illustrative social networking sites are served for the purpose of sharing files, fostering groups of common acquaintances, or building online communities based on common attributes and activities. User 204 is a user more generically logged on to any web site. The primary categorization of user 204 is that a user profile is available that has minimal information about a user, which in turn can be passed on when an advertising content request has been made. The type of web site on which user 204 is logged does not restrict use of the claimed embodiments. Instead, it is merely indicative of some sort of log on procedure, profile storage, and information exchange beneficial to complete an advertising request.

Continuing with FIG. 2, an advertising service directory (ASD) 210 is available to receive requests from the various types of users 202, 204 and 206. ASD 210 need not be in direct connection with users placing advertising requests, but should be available for requests through an established logical connection via the internet as is typically the case with web servers. ASD 210 has three component modules depicted: a reception module 212, a reference module 214, and a direction module 216. The three modules are not to be construed as the only modules present on ASD 210, but could be three of many. Modules 212, 214 and 216 can be distinct, as depicted in the figure, or can have overlapping operations which perform the necessary functions outlined below.

Reception module 212 receives advertising requests from a user, such as user 202, 204 or 206. Reception module can be receive requests from a particular subset of users, or can receive requests from any users. Likewise, reception module 212 may only receive requests sent from a particular web server or group of servers. The request can be specially formatted or may merely include a registered word or phrase that is recognized as a word or phrase catalogued on advertising service directory 210. Upon receiving an advertising request, reception module 212 forwards the request to reference module 214. Reference module 214 contains a data structure that associates registered words and phrases with a location or address of an advertising provider. The words and phrases associated are not of a generic nature, such as "cars" or "shoes," but are specific to certain brands and manufacturers. The words and phrases associated may be much more specific than a single provider, such as the name of one particular shoe or a model of a car that the manufacturer sells. Direction module 216 then sends the request for advertising to the location determined by reference module 214 and completes the advertising request. Thus, targeted advertising specific to a product an online user wishes to learn more about is readily accessible and properly retrieved for the user.

A first business 222, a second business 224, and a third business 226, as well as an advertising publisher 230, are shown in FIG. 2. Each of businesses 222, 224, and 226 are meant to be exemplary in nature and not limiting the scope of the claimed embodiments. Many more than three businesses can receive requests from ASD 210, while the total need not even be as many as three. Advertising publisher 230 is intended to convey a category of advertising entities that provide online advertising content. Advertising publisher 230 could be an agency that simply serves the content to the internet. Likewise, publisher 230 could be a full-service advertising agency that creates, publishes and updates content in a comprehensive way for businesses. The fact that there is a single publisher shown in not intended to require a single advertising publisher is necessary to practice the claimed embodiments of the present invention. Rather, it should be understood that hundreds or even thousands of advertising publishers could be included. The only requirement of the businesses, publishers and advertising coordinated by ASD 210 is that the content be for specific products, services, or businesses.

The requests received by advertising service directory 210 can be sent to the businesses without the need for a bidding process for proper direction. Unlike the results of a search engine, which often times are trying to parse the intent of a search of generic terms, the embodiments of the present invention are specific to registered words and phrases. Therefore, these embodiments establish a more natural one-to-one mapping system for advertising content to terms. The advertising is also distributed, allowing businesses and publishers to host the advertisements directly. This removes the need for centralized stores of advertising content and enables a lower-cost architecture for sites such as search engines. The claimed embodiments also make it easier for a user to receive more information in a simple way. Using a single site or a formatted phrased to reach all sorts of products through advertisements allows cross advertising and easy recall. In an example for an advertisement for a particular car, a simple phrase such as "Push Make Model" could complete the request. This is easier to recall than using a long web site such as www.brand-makeandmodelcar.com or www.brand.com/makeandmodel. Over time, if the method is reinforced in a consistent way, consumers grow accustomed to completing the request. Therefore, advertising in other forms can include a phrase for the consumer to generate more information (e.g., "To learn more, PUSH MAKE MODEL" becomes a familiar method and the user knows where and how to complete the request).

While ASD 210 is shown connected through numerous types of web sites and to numerous businesses and publishers, the implementation can be more specific. For example, a search engine web site could connect to one ASD 210 as the only means of providing the directory. Reference module 214 can be limited to the number of vendors that it can catalogue, so there may be a number of different ASD 210 servers needed to implement the given system. In this instance, the particular server that must be contacted may be further categorized by any means available. As an illustration, requests for cars may go to a first ADS device, shoes may go to a second, and computers may go to a third. Likewise, an entire bank of servers may be required and an intermediary ASD server may be required in order to further direct the request to a "lower level" ASD that has a higher degree of granularity.

Figure 3:
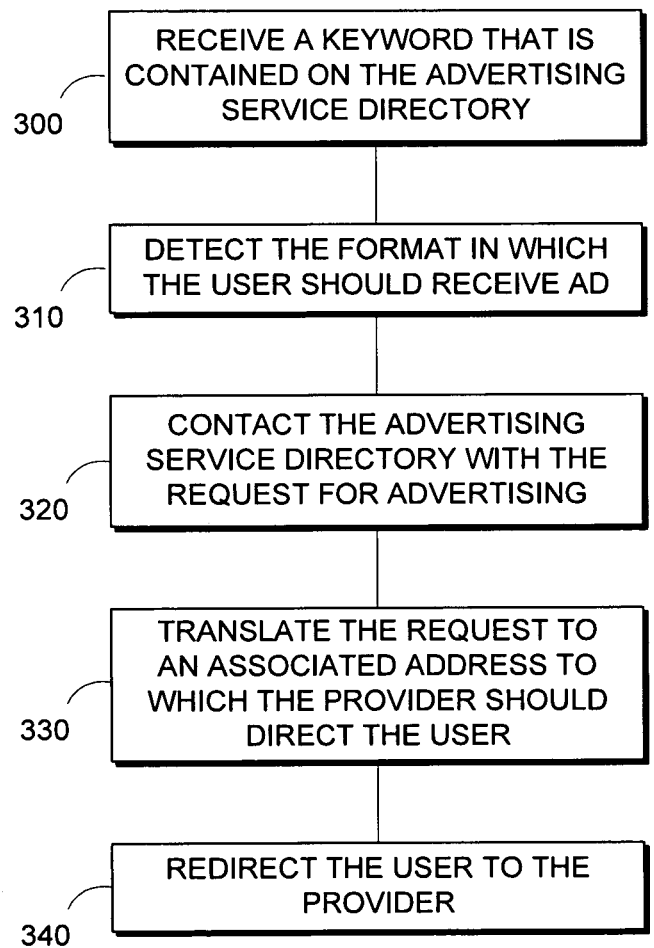
FIG. 3 is a flowchart showing a method for requesting advertising content according to embodiments of the present invention.

Turning to FIG. 3, a flowchart showing a method for generically requesting advertising content according to embodiments of the present invention is shown. At a step 300, a keyword is received that is contained on an advertising service directory. This can be substantially similar to ASD 210 showing keywords found on data structure 214 of the previous figure. The fact that the keyword is available on a data structure in module 214 can be noted with a triggering word or phrase, such as "PUSH AD" followed by the term. This is not necessary to practice the invention, however, as a list of registered terms and phrases could be maintained so that applicable requests are properly intercepted.

At a step 310, a format in which the user should receive the ad is detected. This can be accomplished a number of ways. For example, if the request is sent from a web site where a user is logged on, there will be an associated user profile corresponding to that user. It may be a part of the user profile to indicate if the user prefers e-mails or displays in a certain delivery format, and this indication can be part of the request. Likewise, there may be a default setting for any user sending a request from a particular web site, based on that web site's default advertising methods.

At a step 320, ASD 210 is contacted with the request for advertising as a result of the registered keyword or phrase being entered. At a step 330, the request is translated to an associated address to which the provider should be directed. This may be a single address for any request for a specific company, or it may differ depending on the delivery format of the content. Similar to a domain name server which translates domain names to physical addresses, this translation will allow the ASD 210 to provide a physical address suitable for the advertising content provider. Typically, this will result in the advertising request being sent to a provider-level address corresponding to a domain name server for the company, advertising agency, or web provider at a step 340. The address of the specific device to which is should be routed then follows normal internet conventions after reaching an entry point for the provider.

Figure 4:
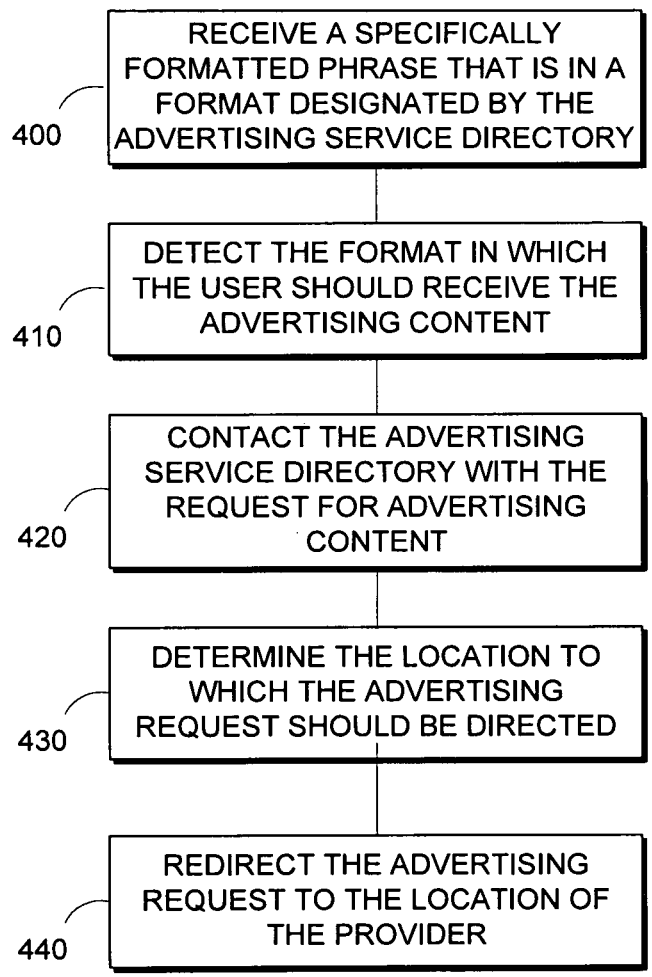
FIG. 4 is a flowchart showing a method for requesting advertising content with a specifically formatted request according to embodiments of the present invention.

Turning to FIG. 4, a flowchart showing a method for requesting advertising content with a specifically formatted request is shown according to embodiments of the present invention. At a step 400, a specifically formatted phrase is received that is a format designated by ASD 210. This could be in the form of a triggering phrase, such as "PUSH" as mentioned previously, or could be through the use of formatting on the web site. Examples include using a check box or radio button to indicate that the phrase being submitted is one of the these registered words or phrases. A field where terms may be entered would simply have the appropriate check box or radio button showing that by checking that option, the user is trying to push a specified ad. Another potential means of specifically formatting the request is to provide a different text field altogether from which the request is sent. Therefore, a term typed in the "main" text field is a regular web search, while the same term in the "push ad" field would contact the ASD directly.

At a step 410, the format in which the user should receive the advertising content is detected. This detection can be substantially similar to the detection techniques discussed for step 310 as given above. As was the case with FIG. 3, steps 420, 430 and 440 contact the ASD 210, determine the location to which the request should be directed, and direct the request to the location.

Figure 5:
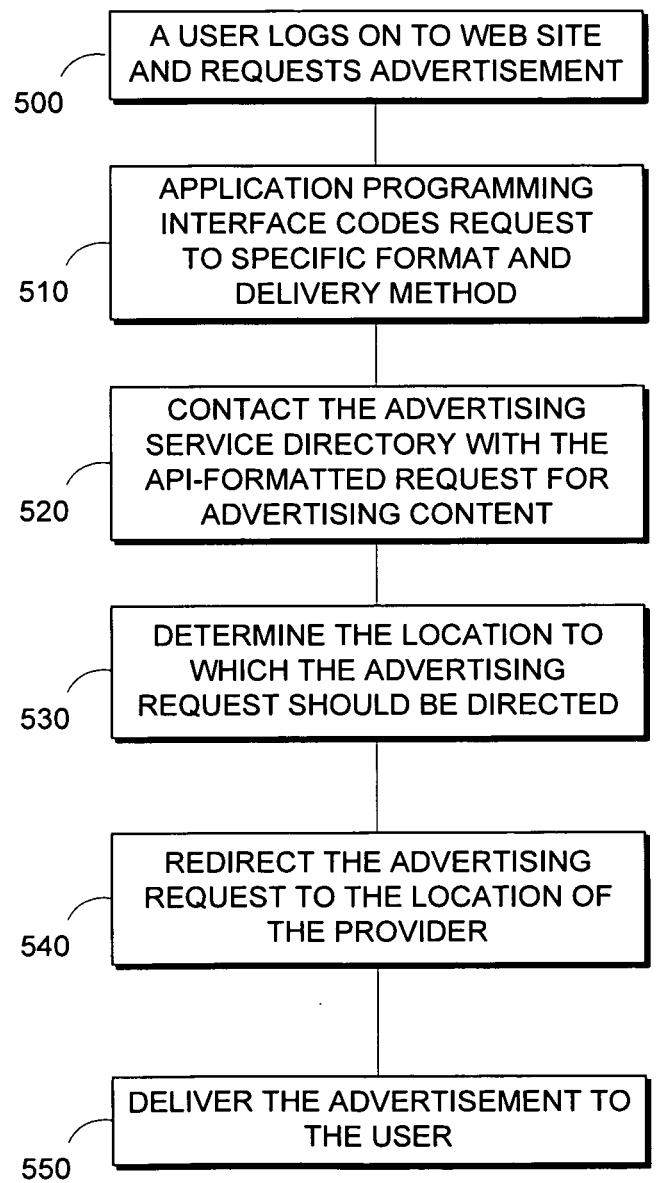
FIG. 5 is a flowchart of a method for users logged on to a web site to request advertising content according to embodiments of the present invention.

Turning to FIG. 5, a flowchart of a method for users logged on to a web site to request advertising content according to embodiments of the present invention is shown. At a step 500, a user logs on to a web site. Again, the type of web site is unimportant. For the sake of illustration, a social networking web site will be described, however, this is a not a limitation of the method shown in the figure. Once the user logs on to the web site, a subsequent advertising request is made. This could be accomplished one of several ways as described above, through special check boxes, buttons, or fields. Alternatively, the user's profile could be utilized to enable the request. A user could set up preferences that allow certain products or services to be automatically "pushed" for advertising content once entered. The advertising request need not come from text entered by the user at all. On a site requiring a log in, specified portions of the site could be used as a virtual store for pushed advertisements. Yet another possibility is the ability of one user to forward an advertising request to another user for a particular product or service the first user found interesting. The next time the second user logs in to the web site, that user would have the option of pushing the advertising request.

At a step 510, an application programming interface codes a request to a specific format and delivery method. This again stems from user profile settings, options selected by the user on the particular request, and/or in relation to the specific request as deemed by the web site or the advertising vendor. For example, Company A could have all requests involving its name coded in a particular way to reach that company through ASD 210 and to provide particular delivery method. The user may have the chance to override that through options present on that user's profile, or to send the request as the company would have it sent.

At a step 520, the request as formatted by the API is sent to ASD 210. The determination of a location to which the request should be sent is made a step 530. Similar to the previously outlined methods, the request is redirected at a step 540. The advertisement, sent with the proper delivery method, is then delivered to a user at a step 550.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A system, which includes a processor operatively coupled to computer storage media, for providing online advertising, the system comprising:
    a reception module that intercepts a search query bound for a search engine, wherein the search query includes a keyword, and wherein the reception module determines whether the search query includes a designated format;
    a reference module that accesses a one-to-one mapping stored on the computer storage media that associates the keyword with an Internet protocol (IP) address of an advertisement provider,
        wherein the search query is routed to the reference module when the search query is deemed to include the designated format,
        wherein the reference module identifies the IP address by leveraging the processor to reference the keyword in the one-to-one mapping;
    a direction module in communication with the reference module that sends an advertisement request to the IP address of the advertisement provider when the reference module identifies the IP address; and
    a search engine that receives the search query from the reception module when the search query is deemed to not include the designated format.

2. The system of claim 1, wherein the keyword is a brand name and wherein the advertisement provider is a business entity that owns the brand name.

3. The system of claim 2, wherein the one-to-one mapping maps the brand name to the IP address of the business entity that owns the brand name.

4. The system of claim 1, wherein the search query includes a set of predetermined text, which triggers the system to provide the advertisement.

5. A computer memory device storing computer-executable instructions that, when executed, perform a method for providing online advertising, the method comprising:
    intercepting, by a reception module, a search query that is received from a client computing device and that is bound for a search engine, wherein the search query includes a keyword;
    determining, by the reception module, whether the search query includes a designated format;
    if the search query does not include the designated format, routing, by the reception module, the search query to the search engine; and
    if the search query does include the designated format:
        routing, by the reception module, the search query to a reference module;
        accessing, by the reference module, a one-to-one mapping that associates the keyword with an Internet protocol (IP) address of an advertisement provider;
        identifying, by the reference module, the IP address of the advertiser in the mapping by referencing the keyword; and
        sending, by a direction module, an advertisement request to the IP address of the advertiser, the advertisement request requesting that the advertiser transmit an advertisement to the client computing device.

6. A computer-implemented method for providing online advertising, the method comprising:
    intercepting, by a reception module, a search query that is received from a client computing device and that is bound for a search engine, wherein the search query includes a keyword;
    determining, by the reception module, whether the search query includes a designated format;
    if the search query does not include the designated format, routing, by the reception module, the search query to the search engine; and
    if the search query does include the designated format:
        routing, by the reception module, the search query to a reference module;
        accessing, by the reference module, a one-to-one mapping that is stored on a computer memory device and that associates the keyword with an Internet protocol (IP) address of an advertisement provider;
        identifying, by the reference module, the IP address of the advertiser in the mapping by referencing the keyword;
        translating by a processor the search query into an advertisement request that is to be sent to the advertiser; and
        sending, by a direction module, the advertisement request to the IP address of the advertiser, the advertisement request requesting that the advertiser transmit an advertisement to the client computing device.

* * * * *